(12) United States Patent
Ah Sue et al.

(10) Patent No.: US 6,775,232 B1
(45) Date of Patent: Aug. 10, 2004

(54) METHOD FOR SCHEDULING DATA FOR COMMUNICATION ON A DIGITAL SUBSCRIBER LINE

(75) Inventors: John D. Ah Sue, Sunnyvale, CA (US); Madhumathi Chandrasekaran, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/569,907

(22) Filed: May 11, 2000

(51) Int. Cl.[7] .......................... H04L 1/00; H04L 12/26
(52) U.S. Cl. .................................. 370/230.1; 370/412
(58) Field of Search ......................... 370/395, 395.21, 370/395.31, 395.32, 395.4, 395.41, 395.42, 395.43, 437, 443, 444, 468, 230.1, 412

(56) References Cited

U.S. PATENT DOCUMENTS

| | | | | |
|---|---|---|---|---|
| 5,491,691 A | | 2/1996 | Shtayer et al. ................. 370/54 |
| 5,497,371 A | * | 3/1996 | Ellis et al. .................... 370/412 |
| 5,519,689 A | | 5/1996 | Kim ............................. 370/17 |
| 5,577,035 A | * | 11/1996 | Hayter et al. ............. 370/395.4 |
| 5,619,500 A | | 4/1997 | Hiekali ......................... 370/414 |
| 5,677,906 A | | 10/1997 | Hayter et al. ................ 370/235 |
| 5,754,530 A | | 5/1998 | Awdeh et al. ................ 370/232 |
| 5,757,771 A | | 5/1998 | Li et al. ........................ 370/235 |
| 5,923,656 A | * | 7/1999 | Duan et al. ............... 370/395.4 |
| 5,991,268 A | | 11/1999 | Awdeh et al. ................ 370/232 |
| 6,003,060 A | | 12/1999 | Aznar et al. .................. 709/103 |
| 6,041,038 A | | 3/2000 | Aimoto ........................ 370/229 |
| 6,049,531 A | | 4/2000 | Roy ............................. 370/260 |
| 6,175,554 B1 | * | 1/2001 | Jang et al. .................... 370/229 |
| 6,198,750 B1 | | 3/2001 | Buchholz et al. ............ 370/463 |
| 6,212,162 B1 | | 4/2001 | Hörlin .......................... 370/229 |
| 6,262,989 B1 | * | 7/2001 | Gemar et al. ................ 370/412 |
| 6,298,059 B1 | | 10/2001 | St-Amand et al. .......... 370/397 |
| 6,307,839 B1 | * | 10/2001 | Gerszberg et al. .......... 370/235 |
| 6,310,862 B1 | | 10/2001 | Roy ............................. 370/260 |
| 6,438,134 B1 | | 8/2002 | Chow et al. ................. 370/412 |
| 6,459,681 B1 | | 10/2002 | Oliva ........................... 370/232 |
| 6,477,144 B1 | | 11/2002 | Morris et al. ............. 370/230.1 |
| 6,483,839 B1 | * | 11/2002 | Gemar et al. ............ 370/395.42 |
| 6,498,782 B1 | * | 12/2002 | Branstad et al. ............ 370/231 |
| 6,510,162 B1 | * | 1/2003 | Fijolek et al. ............... 370/432 |
| 6,512,741 B1 | | 1/2003 | Kohzuki et al. .......... 370/230.1 |
| 6,512,771 B1 | * | 1/2003 | Atarashi et al. .......... 370/395.4 |
| 6,526,063 B1 | | 2/2003 | St-Amand et al. ........ 370/395.5 |
| 6,546,017 B1 | * | 4/2003 | Khaunte ....................... 370/412 |
| 6,560,231 B1 | * | 5/2003 | Kawakami et al. ..... 370/395.43 |
| 6,570,849 B1 | * | 5/2003 | Skemer et al. ........... 370/230.1 |
| 6,618,380 B1 | * | 9/2003 | Mehta et al. ............ 370/395.42 |

OTHER PUBLICATIONS

Di Shuo and Zhang Yaoxue, "A Dual Priority Queue Algorithm for Quality of Service Control in High Speed Networks," Proceedings from ICCT'96, International Conference on Communication Technology, May 5–7, 1996.*

* cited by examiner

*Primary Examiner*—Chau Nguyen
*Assistant Examiner*—Blanche Wong
(74) *Attorney, Agent, or Firm*—Baker Botts L.L.P.

(57) ABSTRACT

A system is disclosed that provides voice, signaling and data communications between customer premises equipment (CPE) and network equipment using a digital subscriber line. If the trained rate of the line is sufficient to meet bandwidth requirements for all communication channels, the system schedules cells for transmission according to the asynchronous transfer mode (ATM) traffic management standard. If the trained rate of the line is insufficient to meet bandwidth requirements for all communications channels, the system schedules cells for transmission using a combination of priority queuing and the ATM traffic management standard.

31 Claims, 5 Drawing Sheets

FIG. 3

| PVC | INFORMATION TYPE | TRANSMISSION TYPE | SCR | PCR | BURST SIZE | SCHEDULING MODE |
|---|---|---|---|---|---|---|
| 1 | VOICE | VBR-rt | 424 | 424 | 5 | ATM |
| 2 | VOICE | VBR-rt | 106 | 106 | 5 | HIGH |
| 3 | VOICE | VBR-rt | 106 | 106 | 5 | HIGH |
| 4 | SIGNAL | VBR-nrt | 50 | 50 | 5 | MEDIUM |
| 5 | SIGNAL | VBR-nrt | 50 | 50 | 5 | ATM |
| 6 | DATA | UBR | — | — | — | ATM |
| 7 | DATA | UBR | — | — | — | ATM |
| ... | ... | ... | ... | ... | ... | ... |

FIG. 4

| 4 | 7 | 1 | 6 | 4 | 1 | 4 | 1 | 1 | ... |
|---|---|---|---|---|---|---|---|---|---|

METHOD FOR SCHEDULING DATA FOR COMMUNICATION ON A DIGITAL SUBSCRIBER LINE

TECHNICAL FIELD OF THE INVENTION

The present invention relates generally to digital subscriber line communications and more particularly to a method for scheduling data for communication on a digital subscriber line.

BACKGROUND OF THE INVENTION

Many digital subscriber line (xDSL) systems use an asynchronous transfer mode (ATM) protocol to schedule the transmission of cells encoding voice, data and signaling information. Using an ATM transmission protocol, cells are scheduled for transmission on an xDSL link according to guaranteed data rates for different communications streams. Typically, voice and signaling cells are guaranteed bandwidth since these communications are time critical. Data cells may be scheduled into the gaps in voice communications and signaling. ATM compliant systems using permanent virtual circuits (PVCs) to transmit voice, data, and signaling adhere to strict guidelines for the scheduling of cells.

If the xDSL link does not provide sufficient bandwidth to meet the guaranteed minimum bandwidths for voice and signaling PVCs, PVCs may be disconnected, PVCs may be downgraded such that all cells are scheduled for transmission without a guaranteed bandwidth, or an administrator may manually adjust the guaranteed bandwidths. Disconnecting a PVC prevents any communications and may also interrupt current communications session. Downgrading PVCs allows an ATM compliant system to continue the transmission of cells using proper scheduling, but it also forces voice and signaling cells to compete with data cells for bandwidth. During periods of intense data communications, this may result in a serious degradation in the quality of voice communications since bursts of data may starve out voice communications.

SUMMARY OF THE INVENTION

In accordance with the present invention, a method for scheduling data for communication on a digital subscriber line is provided which substantially eliminates or reduces disadvantages and problems associated with previous systems and methods. In a particular embodiment, the present invention satisfies the need for a scheduling technique that preserves the quality of voice communications when the available bandwidth of a digital subscriber line falls below a guaranteed minimum bandwidth.

According to one embodiment of the invention, a method for scheduling cells associated with a plurality of communications channels on a digital subscriber line determines an available bandwidth of the line and determines a required bandwidth for the communications channels. The method compares the required bandwidth and the available bandwidth, and based on the comparison, selects a first mode of operation or a second mode of operation. In the first mode of operation, the method schedules the communication of the cells using an asynchronous transfer mode (ATM) communications protocol. In the second mode of operation, the method schedules the communication of the cells using a high priority queue in combination with the ATM communications protocol.

In accordance with another embodiment of the present invention, a method for establishing a priority hierarchy for a plurality of communications channels on a digital subscriber line determines that a required bandwidth for the communications channels exceeds an available bandwidth of the line and assigns a selected one of the communications channels to a high priority queue. The method schedules cells associated with the communications channels using the high priority queue in combination with an ATM communications protocol.

The invention provides a number of technical advantages. While systems that strictly comply to ATM scheduling protocols may potentially suffer severe degradation in the quality of voice communications, this method provides a modification to existing ATM protocols to ensure the quality of voice communications when the available bandwidth on an xDSL link falls below a configured level. During these low bandwidth periods, ATM protocols force voice, signaling, and data cells to compete equally for the same bandwidth. Bursty data communications may starve out time critical transmissions such as voice communications during these intense periods. When the available bandwidth of an xDSL link is insufficient to provide guaranteed bandwidth to voice communications, voice communications channels are removed from the ATM scheduling protocol and scheduled separately using priority queuing.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates an exemplary configuration data table maintained by the device of FIG. 1;

FIG. 4 illustrates an exemplary ATM traffic schedule;

DETAILED DESCRIPTION OF THE INVENTION

Figure 1:
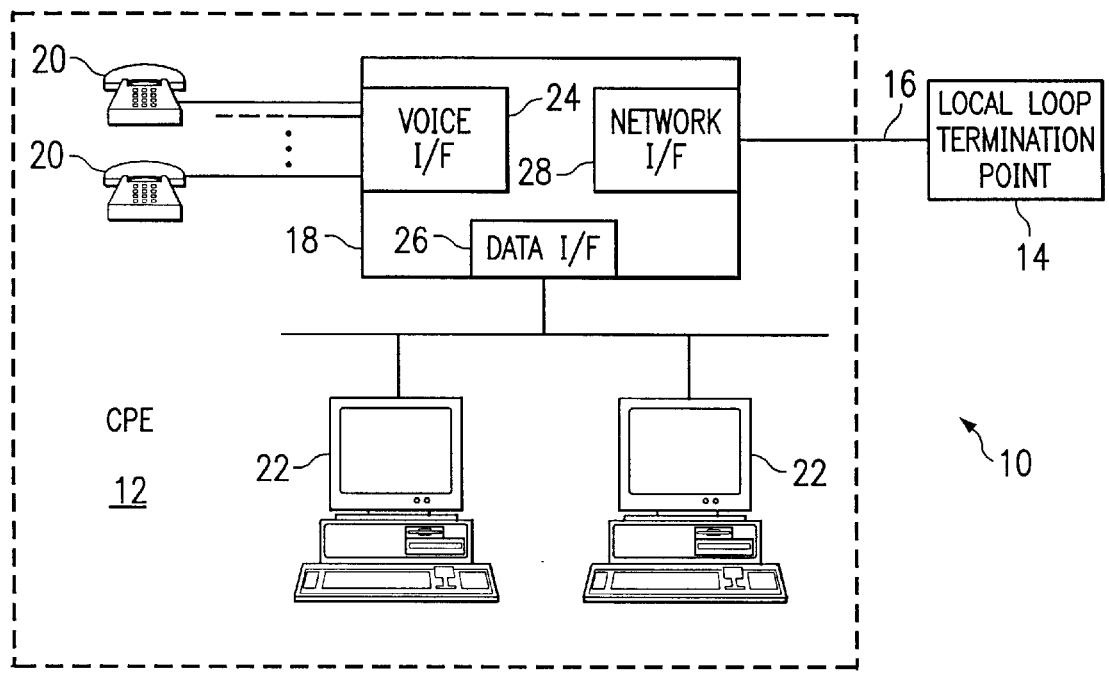
FIG. 1 illustrates a system including a device for scheduling cells for transmission in accordance with the teachings of the present invention.

FIG. 1 illustrates a digital subscriber line (xDSL) communications system, indicated generally at 10, having xDSL communications devices. In general, system 10 provides voice, signaling and data communications on a digital subscriber line and preserves the quality of voice communications during periods of limited bandwidth availability.

System 10 includes customer premises equipment (CPE) 12 that can be located at any one of a number of customer premises, such as businesses, homes, storage facilities, buildings, or other locations. System 10 also includes a local loop termination point 14 which is coupled to CPE 12 via a twisted pair line 16. CPE 12 includes a network interface device (NID) 18 which forms a physical interface between the customer premises and the telephone, data, or other communications networks as well as any other equipment located at the customer premises, such as voice communications devices 20 and data communications devices 22. Network interface device 18 may be a switch, router, or any other appropriate device for communicating between CPE 12 and local loop termination point 14. In a particular embodiment, network interface device 18 is configured with a number of communications channels, such as for example, permanent virtual circuits, each dedicated to the communication of voice, data, or signaling information. Network interface device 18 communicates the information from each of these channels via twisted pair line 16.

Local loop termination point 14 may be a central office, remote terminal or other appropriate termination of the local loop and can include an xDSL access multiplexer (DSLAM) that provides xDSL high bandwidth data service. Twisted pair line 16 supports conventional voice traffic and is intended to support xDSL communications providing sufficient bandwidth for communications channels configured on network interface device 18. However, depending upon physical characteristics of twisted pair line 16, it may only support an xDSL link providing limited bandwidth. For example, the distance of the local loop, any splices in twisted pair line 16, loading on twisted pair line 16, and other physical characteristics affect the integrity of twisted pair line 16 for xDSL communication. System 10 contemplates network interface device 18 accommodating static bandwidth requirements and reacting to dynamic changes in available bandwidth.

Network interface device 18 connects to voice communications devices 20 using a voice interface 24, to data communications devices 22 using a data interface 26, and to twisted pair line 16 using a network interface 28. In one embodiment, network interface device 28 provides xDSL communications using twisted pair line 16. Voice communications devices 20 may be any equipment necessary to provide voice communications, such as an analog telephone, an Internet protocol (IP) telephone, a personal computer running voice communications software, or any other appropriate voice communications device. Data communications devices 22 provide an interface for users of CPE 12 to establish voice and/or data communications sessions with other devices in system 10. Data communications devices 22 may be general purpose computing devices, special purpose data communications devices, or any other appropriate data communications device. In a particular embodiment, data communications devices 22 are personal computers connected using an Ethernet network or other suitable local area network (LAN). Any of the components in system 10 may be implemented using an appropriate combination and arrangement of hardware and/or software. Thus any method or functionality may be implemented by computer software embodied in a computer readable medium. In addition, components may be combined or separated into smaller functional units.

In operation, communications devices 20, 22 establish voice and/or data communications sessions with other devices using network interface device 18. Network interface device 18 communicates voice, data and signaling information associated with these communications sessions using an xDSL link established on twisted pair line 16. Network interface device 18 transmits information encoded in cells, with each cell encoding voice, data or signaling information. Device 18 schedules these cells for transmission using an asynchronous transfer mode (ATM) scheduling protocol. If the bandwidth of the xDSL link is sufficient, the ATM scheduling protocol provides guaranteed minimum bandwidth for voice and signaling. ATM offers quality of service (QoS) guarantees for different types of communications when scheduling cells for various communications channels. In a particular embodiment, device 18 uses at ATM protocol as specified by the ATM forum specification af-tm-0121.000.

When the bandwidth of the xDSL link is insufficient, the ATM scheduling protocol provides no guaranteed minimum bandwidths, since all cells are scheduled with the same priority. During these periods, network interface device 18 schedules selected cells using priority queues and the remaining cells using the ATM scheduling protocol. Using the priority queues in combination with the ATM scheduling protocol, network interface device 18 can preserve the quality of voice communications even when the bandwidth of the xDSL link is not sufficient to maintain guaranteed bandwidths using the ATM scheduling protocol.

Figure 2:
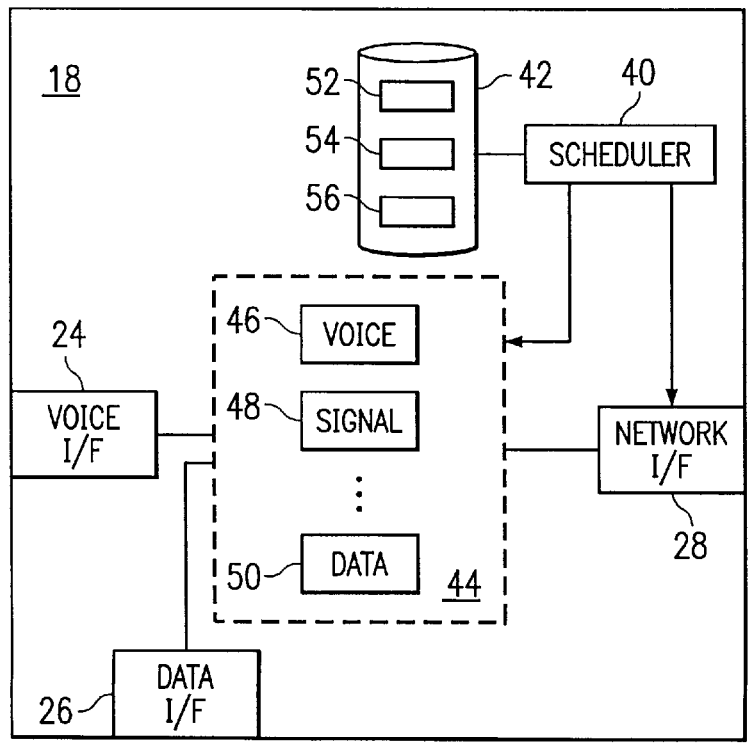
FIG. 2 is a block diagram illustrating the device of FIG. 1.

FIG. 2 is a block diagram illustrating in more detail the functional components of an exemplary network interface device 18. Network interface device 18 contains interfaces 24, 26, 28 as well as a scheduler 40, a memory 42, and a schematic representation of permanent virtual circuits (PVCs) 44. In general, network interface device 18 provides voice, signaling and data communications using PVCs 44 and preserves the quality of voice communications when the available bandwidth on an xDSL link is limited.

PVCs 44 include any number of communications channels that may be configured during the manufacturing of network interface device 18, during the installation or provisioning of network interface device 18, or at some other suitable time. In this example, PVCs 44 include a voice PVC 46, a signal PVC 48, and a data PVC 50. These PVCs 44 represent dedicated communications channels for voice, signaling and data communications. Each PVC 44 is configured to indicate a particular transmission type that supports an ATM QoS guarantee, such as variable bit rate (VBR), unspecified bit rate (UBR), constant bit rate (CBR), or other suitable transmission type. The type for each PVC 44 may be chosen depending on the type of information to be communicated. Communications channels requiring a guaranteed minimum transmission bandwidth may be configured with a transmission type of VBR. Because voice PVC 46 and signal PVC 48 each communicate time critical information, they are typically configured as VBR PVCs. Data PVC 50, on the other hand, is typically configured with a transmission type of UBR, since data communications are not time critical, and UBR PVCs are not guaranteed a minimum transmission bandwidth. Rather, UBR PVCs depend upon the nature of VBR communications channels to ensure that UBR PVCs are not starved for transmission bandwidth. Voice PVC 46 and signal PVC 48 will typically transmit brief segmented portions of data, since voice and signaling communications do not require a constant flow of information. For example, during pauses in speech, voice PVC 46 will require no bandwidth, and data communications may be scheduled into the periods of non-use. In addition, the total bandwidth of the xDSL link may be sufficient to support simultaneous voice and data transmissions.

While both voice and signaling communications contain time critical information, network interface device 18 must transmit voice information virtually instantaneously in order to maintain the quality of voice communications. Thus, voice PVC 46 will typically be configured as a real-time VBR (VBR-rt) that is given the highest priority. Signal PVC 48 communicates time critical information, yet does not require real-time transmission, and thus may be configured as a non real-time VBR (VBR-nrt).

Scheduler 40 schedules the transmission of information cells from PVCs 44 and controls the transmission of these cells according to that schedule using network interface 28. Memory 42 represents any one or combination of volatile or non-volatile, local or remote devices suitable for storing data, for example, random access memory (RAM) devices, read-only memory (ROM) devices, magnetic storage devices, optical storage devices, or any other suitable data storage devices. Memory 42 stores configuration data 52, an ATM traffic schedule 54 and queuing data 56, which are described below.

Each of the components in network interface device 18 may be implemented using any suitable combination and arrangement of hardware and/or software. In addition, functionalities from each of these components may be combined or separated into smaller functional units when appropriate, and any of the methods or functionalities described may be implemented by a computer program stored on a computer readable medium.

In operation, network interface device 18 establishes an xDSL link on twisted pair line 16 using network interface 28. Network interface 28 trains the xDSL link to provide transmission bandwidth that is determined by the trained rate. The trained rate provides an upstream bandwidth for the transmission of information to local loop termination point 14 and a downstream bandwidth for the transmission of information from local loop termination point 14. Based on communications with voice communications devices 20, voice interface 24 encodes voice and signaling information into cells for communication using voice PVC 46 and signal PVC 48. Based on communications with data communications devices 22, data interface 26 encodes voice, signaling and data information into cells for communication using voice PVC 46, signal PVC 48 and/or data PVC 50. Information from voice PVC 46, signal PVC 48 and data PVC 50 is communicated to local loop termination point 14 via the xDSL link on twisted pair line 16.

Scheduler 40 schedules cells from voice PVC 46, signal PVC 48 and data PVC 50 for communication based upon the trained rate of the xDSL link. If the trained rate is sufficient to meet the configured requirements of PVCs 44, scheduler 40 schedules cells for transmission using an ATM traffic schedule developed from configuration data 52. However, if the trained rate of the xDSL link is insufficient to meet the requirements of PVCs 44 as configured, scheduler 40 operates in a second mode in which it schedules cells for transmission using queuing data 56 and ATM traffic schedule 54.

Configuration data 52 includes any information describing communications channels configured on network interface device 18 or other information necessary for the communication of cells using an xDSL link. For example, configuration data 52 may store channel type such as VBR or UBR, channel information type such as voice or signaling, data communication rates, and any other suitable information. Queuing data 56 includes information indicating which communications channels to schedule using priority queuing. For example, queuing data 56 may indicate that a specific communications channel in configuration data 52 is to be scheduled as a high priority queue. ATM traffic schedule 54 represents a dynamically generated schedule for the transmission of cells, and network interface device 18 generates ATM traffic schedule 54 according to ATM scheduling protocols. For example, configuration data 52 may indicate minimum and maximum transmission rates for communications channels, and network interface device 18 generates ATM traffic schedule 56 to guarantee these minimums and maximums. After determining the required bandwidth for all communications channels described in configuration data 52 and the available bandwidth of line 16, network interface device 18 schedules cells for transmission using ATM traffic schedule 56 alone or in combination with queuing data 56.

For example, voice communications device 20 establishes a voice communications session using voice interface 24, and data communications device 22 establishes a data communications session using data interface 26. For the voice communication session, voice interface 24 generates cells encoding voice information for communication using voice PVC 46 and cells encoding signaling information for communication using signal PVC 48. For the data communication session, data interface 26 generates cells encoding the data for communication using data PVC 50. If the trained rate of the xDSL link is sufficient, scheduler 40 operates using the first mode of operation in which all cells are scheduled for transmission using ATM traffic schedule 54. In this first mode of operation, ATM traffic schedule 54 guarantees bandwidth for voice and signaling.

However, if the trained rate of the xDSL link is insufficient, the cells in voice PVC 46 are assigned to a high priority queue using queuing data 56. The bandwidth may drop below a required bandwidth due to static conditions such as the condition of twisted pair line 16 or due to dynamic conditions such as unexpected line noise resulting in the retraining of the link or shifts in the available bandwidth of the link. The remaining cells in signal PVC 48 and data PVC 50 are scheduled for transmission using ATM traffic schedule 54. Using the high priority queue in combination with ATM traffic schedule 54, scheduler 40 preserves the quality of voice communications even during periods of low transmission bandwidth. Scheduler 40 accomplishes this by scheduling the cells in voice PVC 46 for immediate transmission before any other cells. When no cells are awaiting transmission in voice PVC 46, cells awaiting transmission in signal PVC 48 and data PVC 50 are scheduled for transmission using ATM traffic schedule 54. Because of the nature of voice communications, this technique can maintain the quality of the voice connection without starving the underlying signaling and data communications. Except in cases of extreme bandwidth limitation, gaps in the voice communications session will be sufficient for the transmission of signal and data cells from signal PVC 48 and data PVC 50.

FIG. 3 illustrates an exemplary table 60 maintaining configuration data 52 and scheduling information. Configuration data 52 indicates an information type, a transmission type, a sustained cell rate (SCR), a peak cell rate (PCR), and a burst size for each PVC 44. Table 60 also indicates a scheduling mode for each PVC 44, which indicates the method used by network interface device 18 to schedule cells from the PVC for transmission. For example, the scheduling mode may indicate queuing data 56, and network interface device 18 may access the scheduling mode to determine whether each PVC 44 is to be scheduled in a high, medium, or low priority queue or using ATM traffic schedule 54.

The information type for each PVC 44 indicates whether the channel is configured for voice, signal or data communications. The transmission type indicates VBR-rt, VBR-nrt, UBR, or other suitable designator, which, as previously discussed, are typically used for voice, signal and data PVCs respectively. The remaining fields represent ATM traffic shaping parameters used by scheduler 40 in generating ATM traffic schedule 54. SCR represents an average guaranteed transmission bandwidth, since PVC 44 may sustain that cell rate over any period of time. PCR indicates the maximum transmission rate for PVC 44, and burst size indicates the number of cells communicated in a burst using PVC 44.

Scheduler 40 uses configuration data 52 to determine the appropriate scheduling protocol, to assign PVCs 44 to queues when necessary, and to determine ATM traffic schedule 54. The values shown for configuration data 52 in table 60 are meant only to clarify the operation of a particular embodiment of system 10 by providing specific examples. Network interface device 18 contemplates providing any number and type of PVCs 44 and maintaining any necessary data using table 60 to permit the proper scheduling of cells for communication. Table 60 will reflect the number and type of PVCs 44 configured within network interface device 18, and will maintain configuration data 52 using any appropriate format. As previously discussed configuration data 52 describing PVCs 44 may be loaded into table 60 at any appropriate time.

FIG. 4 illustrates an exemplary ATM traffic schedule 54 used by network interface device 18 to schedule cells for transmission on line 16. Network interface device 18 generates ATM traffic schedule 54 dynamically to ensure ATM traffic scheduling parameters dictated by the ATM communications protocol. In a particular embodiment, scheduler 40 schedules cells according to the ATM traffic management standard. Using a current channel indicator 70, network interface 18 determines which PVC 44 is currently scheduled to transmit a cell. Network interface device 18 uses ATM traffic schedule alone or in combination with queuing data 56 to schedule the communication of cells from PVCs 44.

Figure 5:
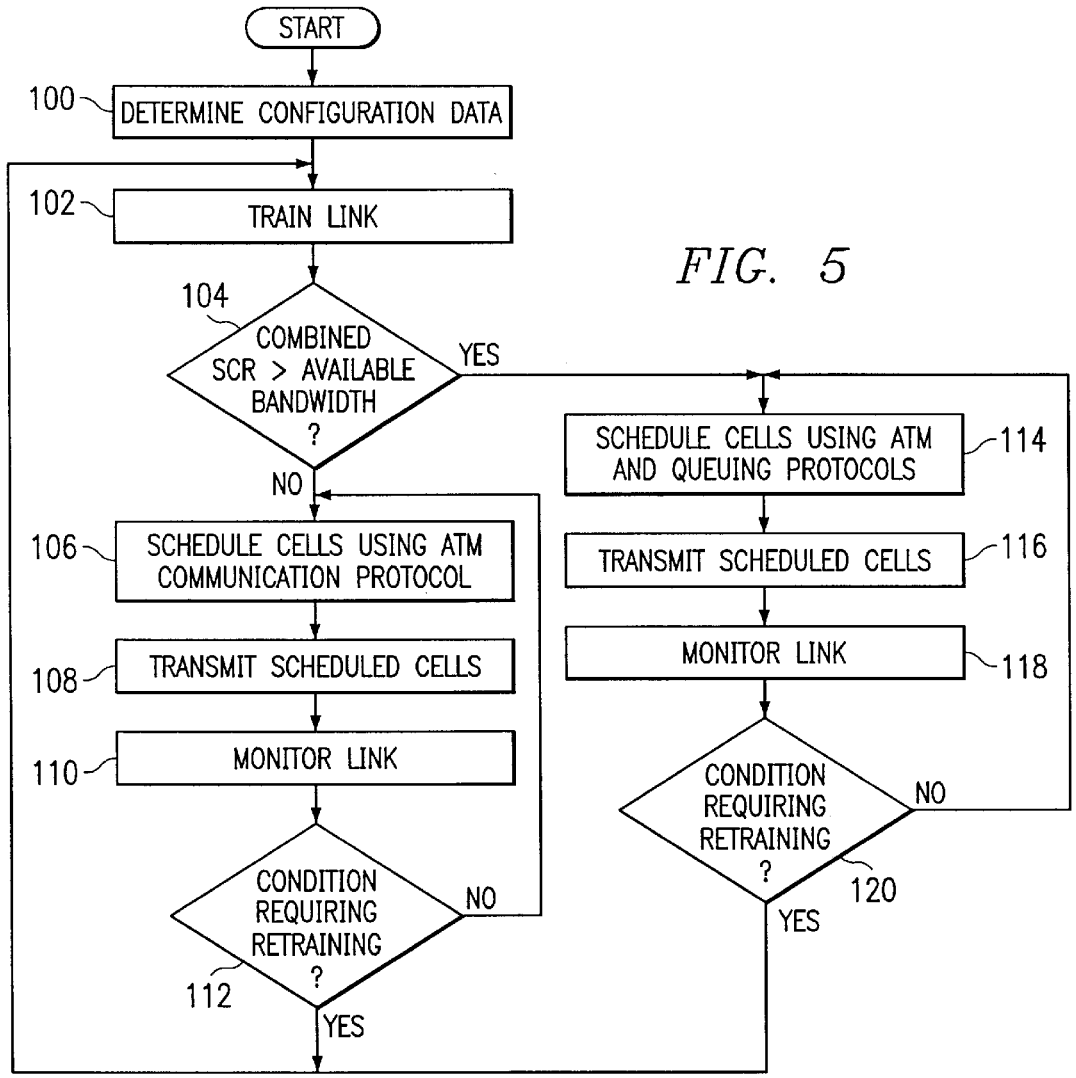
FIG. 5 is a flowchart of a method for selecting an appropriate scheduling protocol.

FIG. 5 is flowchart illustrating a method for determining an appropriate scheduling protocol. Scheduler 40 accesses table 60 to determine configuration data 52 for PVCs 44 within network interface device 18 at step 100. Scheduler 40 determines, for each PVC 44, the transmission type, the SCR, the PCR and the burst size. This also includes a determination of the combined SCR for all PVCs 44. Network interface device 18 trains an xDSL link on twisted pair line 16 at step 102. Scheduler 40 determines whether the combined SCR of PVCs 44 is greater than the available bandwidth of the xDSL link at step 104. If not, the xDSL link has sufficient bandwidth to guarantee each of PVCs 44 their configured sustained cell rate using normal ATM traffic scheduling. Thus, scheduler 40 schedules cells using an ATM communication protocol at step 106. This includes determining the ATM traffic shaping parameters from configuration data 52 and developing ATM traffic schedule 54 to schedule the communication of cells. ATM traffic schedule 54 provides scheduling of VBR PVCs to guarantee the sustained cell rate while ensuring that the communications will not exceed the peak cell rate. Data cells with a transmission type of UBR are then scheduled into the gaps in VBR transmissions resulting from the ATM traffic shaping.

Network interface device 18 transmits scheduled cells using network interface 28 at step 108. Network interface device 18 monitors the xDSL link and determines whether a condition requiring retraining of the link has occurred at steps 110 and 112 respectively. If the link does not require retraining, network interface device 18 continues the scheduling, transmitting, and monitoring at steps 106, 108 and 110. However, if line conditions have deteriorated such that the xDSL link can no longer support the trained rate, the xDSL link may be retrained at step 102. In a particular embodiment, equipment at a central office monitors the link and controls when to retrain the link. After retraining, device 18 detects the new bandwidth for the link. While this example focuses on xDSL links that require retraining in order to modify the available bandwidth, system 10 contemplates using communications protocols that may modify the available bandwidth without retraining, such as rate adaptive digital subscriber line (RADSL) communications. Thus network interface device 18 may react to any change in the available bandwidth caused by retraining, rate adaptation, changing line conditions, or other appropriate condition.

If at step 104 it is determined that the combined SCR for PVCs 44 is greater than the available bandwidth of the trained xDSL link, scheduler 40 uses a second mode of operation for scheduling cells for transmission at step 114. The second mode of operation schedules cells using a combination of priority queuing and ATM traffic scheduling. In a particular embodiment, voice PVC 46 is assigned to a high priority queue while the other PVCs 44 remain in the ATM traffic schedule. To develop the ATM traffic schedule, scheduler 40 accesses configuration data 52 for the PVCs not assigned to the high priority queue and develops ATM traffic schedule 54 for these PVCs. In scheduling cells for transmission, cells in the high priority queue (from voice PVC 46) are scheduled for transmission before any other cells. When no cells are awaiting transmission in voice PVC 46, the remaining cells are scheduled for transmission according to ATM traffic schedule 54. Network interface device 18 transmits scheduled cells using network interface 28 at step 116.

Network interface device 18 monitors the xDSL link and determines whether a condition requiring retraining of the link has occurred at steps 118 and 120 respectively. If the link does not require retraining, network interface device 18 continues the scheduling, transmitting, and monitoring at steps 114, 116 and 118. However, if line conditions have deteriorated such that the xDSL link can no longer support the trained rate, network interface device 18 retrains the xDSL link at step 102.

Figure 6:
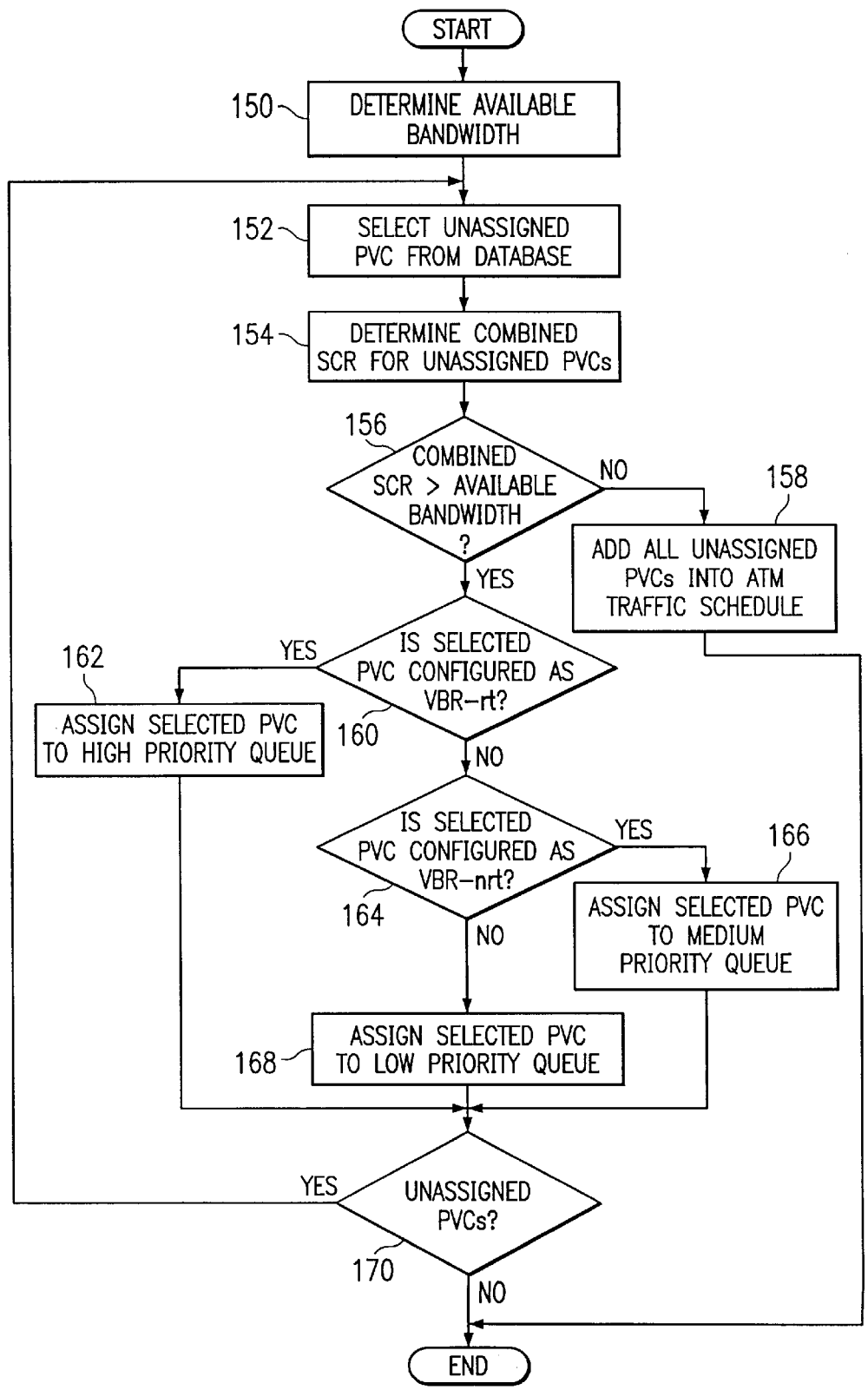
FIG. 6 is a flowchart of a method for assigning communications channels to various queues and to an ATM traffic schedule.

FIG. 6 is a flowchart illustrating in detail an exemplary method for assigning PVCs 44 among various queues and to an ATM communication protocol. Although previous examples focus on placing one voice PVC 46 into a high priority queue, a high priority queue may be used for multiple voice PVCs 46 or multiple levels of queues may be used for multiple PVC transmission types.

Scheduler 40 determines the available bandwidth of the xDSL link on twisted pair line 16 at step 150. Scheduler 40 selects an unassigned PVC 44 from table 60 at step 152.

At start up, no PVCs 44 are assigned to a queue or to the ATM traffic schedule. Scheduler 40 selects the unassigned PVC with the highest priority, that is, a VBR-rt PVC if possible. Then, scheduler 40 determines the combined SCR for unassigned PVCs at step 154 (this includes the selected PVC). Scheduler 40 then determines whether the combined SCR for unassigned PVCs is greater than the available bandwidth of the trained xDSL link at step 156. If not, ATM traffic schedule 54 can be used to schedule the transmission of voice, signal and data cells without sacrificing the quality of voice communications. Thus, if the combined SCR is not greater than the available bandwidth for the trained xDSL link, scheduler 40 adds all unassigned PVCs into ATM traffic schedule 54 at step 158. This includes determining ATM traffic shaping parameters from configuration data 52 and developing ATM traffic schedule 54 based on these ATM traffic shaping parameters. After assigning all unassigned PVCs into ATM traffic schedule 54 at step 158, scheduler 40 has completed assigning PVCs 44 to the queues and developing ATM traffic schedule 54.

However, if the combined SCR is greater than the available bandwidth of the trained xDSL link, then the selected PVC must be assigned to a particular queue. Scheduler 40 determines whether the selected PVC is configured as VBR-rt at step 160. If so, the selected PVC is assigned to a high priority queue at step 162 and then flow continues to step 170. If not, scheduler 40 determines whether the selected PVC is configured as VBR-nrt at step 164. If so, the selected PVC is assigned to a medium priority queue at step 166 and then flows skips to step 170. If the selected PVC is not configured as VBR-nrt, then the selected PVC is configured as UBR, and scheduler 40 assigns the selected PVC to a low priority queue at step 168. Scheduler 40 determines whether there are any remaining unassigned PVCs at step 170. If so, scheduler 40 selects an unassigned PVC from table 60 at step 152 in the manner as previously described. If it is determined that there are no remaining unassigned PVCs, scheduler 40 has completed the assigning of selected PVCs to queues and scheduling the remaining PVCs using ATM traffic schedule 54.

Figure 7:
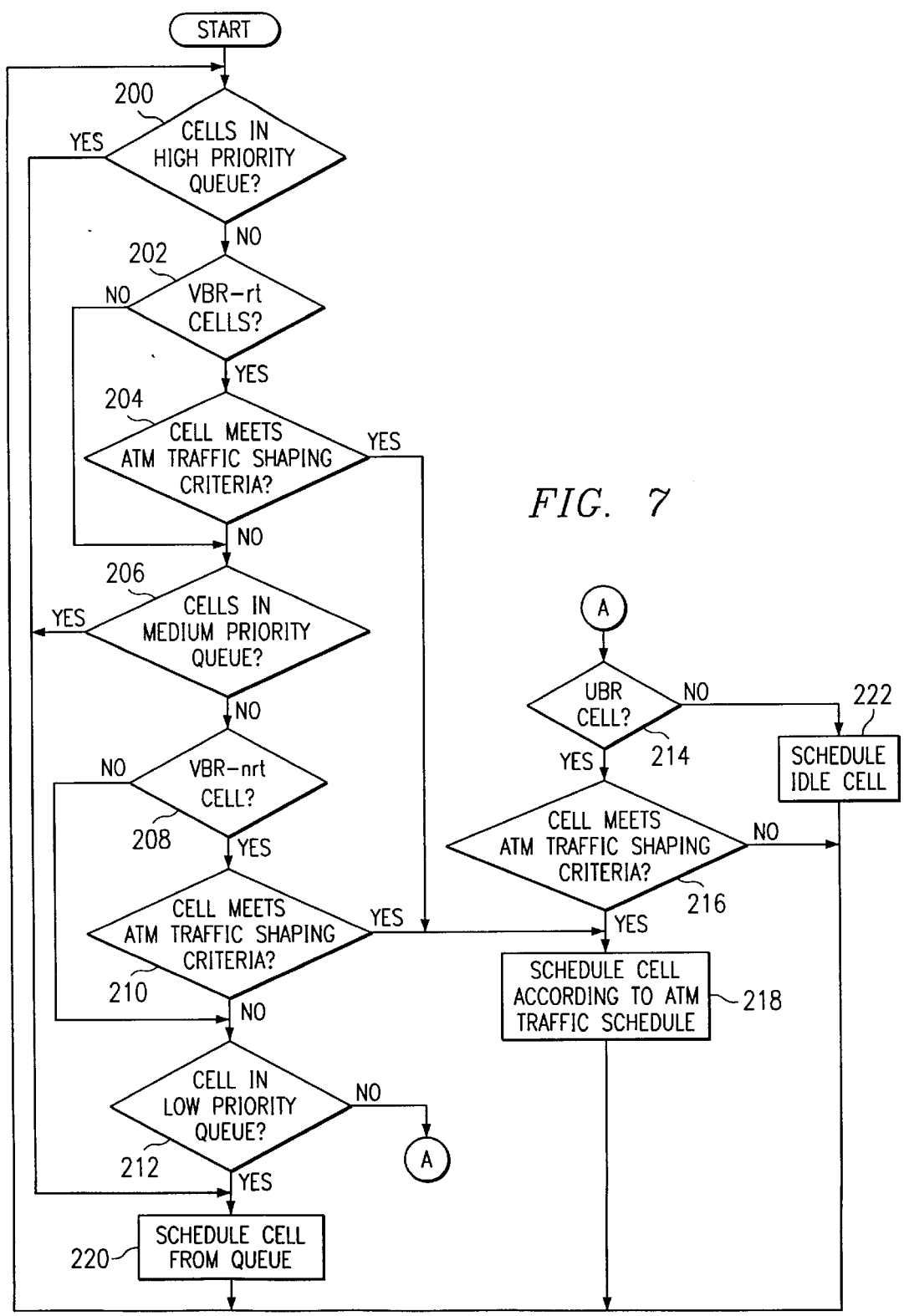
FIG. 7 is a flowchart of a method for scheduling data using a combination of queues and an ATM traffic schedule.

FIG. 7 is a flowchart illustrating an exemplary method for scheduling cells for communication using priority queuing in combination with ATM traffic shaping. This method assumes that PVCs 44 have been assigned to queues and ATM traffic schedule 54 has been generated using either the method of the previous flowchart or any other appropriate method. In this exemplary flowchart, cells are scheduled using a high, medium, and low priority queue in combination with ATM traffic scheduling. This provides a hierarchy for cell transmission: high priority cells, VBR-rt cells, medium priority cells, VBR-nrt cells, low priority cells, and UBR cells. Network interface device 18 transmits VBR-rt cells, VBR-nrt cells, and UBR cells, as much as possible, according to ATM traffic shaping parameters, while cells in the queues are transmitted as soon as possible according to the hierarchy.

Scheduler 40 determines whether there are cells awaiting transmission in the high priority queue at step 200. In a particular embodiment, the high priority queue contains a pointer directing scheduler 40 to check for cells awaiting transmission in a selected one of PVCs 44. Alternatively, the high priority queue may contain multiple pointers directing scheduler 40 to check for cells in multiple PVCs 44. Thus, one or more PVCs 44 can be assigned to the high priority queue simply using pointers. A similar technique can be used to assign PVCs 44 to the medium priority queue or to the low priority queue.

If scheduler 40 determines that there are cells awaiting transmission in the high priority queue, scheduler 40 schedules these cells for transmission at step 220 and then returns to step 200. If not, scheduler 40 determines whether there are VBR-rt cells awaiting transmission at step 202. If not, flow skips to step 206. If there are VBR-rt cells awaiting transmission, scheduler 40 determines whether the cells may be scheduled according to ATM traffic schedule 54 at step 204. If so, scheduler 40 schedules a VBR-rt cell according to ATM traffic schedule 54 at step 218 and then returns to step 200.

If there are no high priority cells or VBR-rt cells ready to be scheduled, scheduler 40 determines whether there are cells awaiting transmission in the medium priority queue at step 206. If so, scheduler 40 schedules a medium priority cell for transmission at step 220 and then returns to step 200. If not, scheduler 40 determines whether there are VBR-nrt cells awaiting transmission at step 208. If not, flow skips to step 212. If there are VBR-nrt cells awaiting transmission, scheduler 40 determines whether these cells may be scheduled for transmission according to ATM traffic schedule 54 at step 210. If so, scheduler 40 schedules a VBR-nrt cell for transmission according to ATM traffic schedule 54 at step 218 and then returns to step 200.

If there are no high or medium priority cells or VBR cells ready to be scheduled, scheduler 40 determines whether there are cells awaiting transmission in the low priority queue at step 212. If so, scheduler 40 schedules a cell from the low priority queue for transmission at step 220. If there are no cells awaiting transmission in the low priority queue, scheduler 40 determines whether there are any UBR cells awaiting transmission at step 214. If not, the scheduling process is restarted at step 200. If there are UBR cells awaiting transmission, scheduler 40 determines whether a UBR cell may be scheduled for transmission according to ATM traffic schedule 54 at step 216. If so, scheduler 40 schedules a UBR cell for transmission according to ATM traffic schedule 54 at step 218. If no UBR cells may be scheduled, scheduler 40 may schedule an idle cell at step 222, and then the scheduling process returns to step 200.

While this flowchart demonstrates an exemplary method for scheduling cells for communication using multiple priority queues in combination with ATM traffic shaping, system 10 contemplates using any appropriate method for scheduling the transmission of cells using one or more queues in combination with ATM traffic schedule 54. Moreover, in a particular embodiment, a simpler method may be employed using only one high priority queue in combination with ATM traffic schedule 54. This allows the quality of voice communications to be maintained in the high priority queue while still scheduling the remaining cells using ATM traffic shaping.

In addition, the preceding flowcharts illustrate only exemplary methods for carrying out the determination of the appropriate scheduling protocol, assigning of PVCs 44, and scheduling cells for transmission using priority queues in combination with ATM traffic shaping. Network interface device 18 contemplates many of the steps in these flowcharts taking place simultaneously and/or in different orders than as shown in FIGS. 4–6. Furthermore, network interface device 18 contemplates using methods with additional steps, fewer steps, or different steps, so long as the methods remain appropriate for determining an appropriate scheduling protocol, assigning PVCs 44 to priority queues, generating ATM traffic schedule 54, and scheduling cells for transmission according to the priority queues and ATM traffic schedule 54.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for scheduling cells associated with a plurality of communications channels on a digital subscriber line comprising:

determining an available bandwidth of the line;

determining a required bandwidth for the communications channels;

comparing the required bandwidth and the available bandwidth;

selecting a first mode of operation or a second mode of operation based on the comparison;

in the first mode of operation, scheduling the communication of the cells using an asynchronous transfer mode (ATM) communications protocol; and in the second mode of operation, scheduling the communication of the cells using a high priority queue in combination with the ATM communications protocol, wherein scheduling the communication of the cells using the high priority queue in combination with the ATM communications protocol comprises:

assigning a communications channel for voice communications to the high priority queue;

determining traffic shaping parameters for remaining communications channels not assigned to the high priority queue;

determining a traffic schedule based on the traffic shaping parameters;

scheduling cells from communications channels assigned to the high priority queue for communication before other cells from the remaining communications channels; and scheduling the communication of the other cells according to the traffic schedule.

2. The method of claim 1, wherein the communications channels comprise permanent virtual circuits (PVCs), and the ATM communications protocol comprises the ATM traffic management standard.

3. The method of claim 1, wherein the required bandwidth comprises a combined sustained cell rate for the communications channels.

4. The method of claim 1, wherein scheduling the communication of the cells using the ATM communications protocol comprises:

determining traffic shaping parameters for the communications channels;

determining a traffic schedule based on the traffic shaping parameters; and scheduling the cells according to the traffic schedule.

5. The method of claim 1, wherein selecting the first mode or the second mode comprises:

selecting the first mode when the available bandwidth is greater than or equal to the required bandwidth; and selecting the second mode when the available bandwidth is less than the required bandwidth.

6. The method of claim 1, wherein cells from communications channels in the high priority queue are scheduled for communication before any other cells.

7. A method for establishing a priority hierarchy for a plurality of communications channels on a digital subscriber line comprising:

determining that a required bandwidth for the communications channels exceeds an available bandwidth of the line;

assigning a selected one of the communications channels to a high priority queue; and scheduling the communication of cells associated with the communications channels using the high priority queue in combination with an asynchronous transfer mode (ATM) communications protocol, wherein scheduling the communication of the cells associated with the communications channels comprises:

determining ATM traffic shaping parameters for remaining communications channels not assigned to the high priority queue;

determining a traffic schedule based on the traffic shaping parameters;

scheduling cells from communications channels in the high priority queue for communication before other cells from the remaining communications channels; and scheduling the other cells according to the traffic schedule.

8. The method of claim 7, wherein determining that the required bandwidth for the communications channels exceeds the available bandwidth of the line comprises:

determining that the line has trained up at a trained rate;

determining the available bandwidth based on the trained rate;

calculating the required bandwidth by summing guaranteed bandwidths for the communications channels; and determining that the required bandwidth for the communications channels exceeds the available bandwidth.

9. The method of claim 7, wherein the required bandwidth comprises a combined sustained cell rate for the communications channels.

10. The method of claim 7, wherein the communications channels comprise permanent virtual circuits (PVCs), and the ATM communications protocol comprises the ATM traffic management standard.

11. The method of claim 7, further comprising:

determining that a required bandwidth for remaining communications channels not assigned to the high priority queue exceeds the available bandwidth; and assigning a selected one of the remaining communications channels to the high priority queue.

12. The method of claim 7, wherein assigning a selected one of the communications channels comprises:

selecting a communications channel from the communications channels, wherein a priority of the selected communications channel is highest among communications channels not assigned to the high priority queue; and assigning the selected communications channel to the high priority queue.

13. The method of claim 12, wherein the priority of the selected communications channel is determined based on whether the selected communications channel communicates cells encoding voice, signals, or data.

14. Software for communicating cells associated with a plurality of communications channels on a digital subscriber line, the software embodied in a computer readable medium and operable to:

determine an available bandwidth based on a trained rate of the line;

determine a required bandwidth for the communications channels;

compare the required bandwidth and the available bandwidth;

select a first mode of operation or a second mode of operation based on the comparison;

in the first mode of operation, schedule the communication of the cells using an asynchronous transfer mode (ATM) communications protocol; and in the second mode of operation, schedule the communication of the cells using a high priority queue in combination with the ATM communications protocol, wherein the software is further operable to schedule the communication of the cells using the high priority queue in combination with the ATM communications protocol by:

assigning a communications channel for voice communications to the high priority queue;
determining traffic shaping parameters for remaining communications channels not assigned to the high priority queue;
developing a traffic schedule based on the traffic shaping parameters;
scheduling cells from communications channels assigned to the high priority queue for communication before other cells from the remaining communications channels; and
scheduling the communication of the other cells according to the traffic schedule.

15. The software of claim 14, wherein the communications channels comprise permanent virtual circuits (PVCs), and the ATM communications protocol comprises the ATM traffic management standard.

16. The software of claim 14, wherein the required bandwidth comprises a combined sustained cell rate for the communications channels.

17. The software of claim 14, wherein the software is further operable to schedule the communication of the cells using the ATM communications protocol by:
determining traffic shaping parameters for the communications channels;
developing a traffic schedule based on the traffic shaping parameters; and
scheduling the cells according to the traffic schedule.

18. The software of claim 14, further operable to:
select the first mode when the available bandwidth is greater than or equal to the required bandwidth; and
select the second mode when the available bandwidth is less than the required bandwidth.

19. The software of claim 14, wherein cells from communications channels in the high priority queue are scheduled for communication before any other cells.

20. A digital subscriber line communications apparatus comprising:
a voice interface operable to receive voice communications;
a data interface operable to receive data communications;
a network interface coupled to a digital subscriber line, the network interface operable to communicate the voice communications, the data communications, and signaling information as cells associated with communications channels on the line; and
a scheduler operable to:
determine an available bandwidth of the line;
determine a required bandwidth for the communications channels;
compare the required bandwidth and the available bandwidth;
select a first mode of operation or a second mode of operation based on the comparison;
in the first mode of operation, schedule the communication of the cells using an asynchronous transfer mode (ATM) communications protocol; and
in the second mode of operation, schedule the communication of the cells using a high priority queue in combination with the ATM communications protocol, wherein the scheduler, in the second mode of operation, is further operable to:
assign a communications channel for the voice communications to the high priority queue;
determine traffic shaping parameters for remaining communications channels not assigned to the high priority queue;
determine a traffic schedule based on the traffic shaping parameters;
schedule cells from communications channels assigned to the high priority queue for communication before other cells from the remaining communications channels; and
schedule the communication of the other cells according to the traffic schedule.

21. The communications apparatus of claim 20, wherein the communications channels comprise permanent virtual circuits (PVCs), and the ATM communications protocol comprises the ATM traffic management standard.

22. The communications apparatus of claim 20, wherein the required bandwidth comprises a combined sustained cell rate for the communications channels.

23. The communications apparatus of claim 20, wherein the scheduler, in the first mode of operation, is further operable to:
determine traffic shaping parameters for the communications channels;
determine a traffic schedule based on the traffic shaping parameters; and
schedule the cells according to the traffic schedule.

24. The communications apparatus of claim 20, wherein the scheduler is further operable to:
select the first mode of operation when the available bandwidth is greater than or equal to the required bandwidth; and
select the second mode of operation when the available bandwidth is less than the required bandwidth.

25. The communications apparatus of claim 20, wherein the scheduler is further operable to schedule cells from communications channels in the high priority queue before any other cells.

26. A communications apparatus comprising:
means for determining an available bandwidth of the line;
means for determining a required bandwidth for the communications channels;
means for comparing the required bandwidth and the available bandwidth;
means for selecting a first mode of operation or a second mode of operation based on the comparison;
means for, in the first mode of operation, scheduling the communication of the cells using an asynchronous transfer mode (ATM) communications protocol; and
means for, in the second mode of operation, scheduling the communication of the cells using a high priority queue in combination with the ATM communications protocol, wherein the means for scheduling the communication of the cells using the high priority queue in combination with the ATM communications protocol comprises:
means for assigning a communications channel for voice communications to the high priority queue;
means for determining traffic shaping parameters for remaining communications channels not assigned to the high priority queue;
means for determining a traffic schedule based on the traffic shaping parameters;
means for scheduling cells from communications channels assigned to the high priority queue for communication before other cells from the remaining communications channels; and
means for scheduling the communication of the other cells according to the traffic schedule.

27. The communications apparatus of claim 26, wherein the communications channels comprise permanent virtual circuits (PVCs), and the ATM communications protocol comprises the ATM traffic management standard.

28. The communications apparatus of claim 26, wherein the required bandwidth comprises a combined sustained cell rate for the communications channels.

29. The communications apparatus of claim 26, wherein scheduling the communication of the cells using the ATM communications protocol comprises:

means for determining traffic shaping parameters for the communications channels;

means for determining a traffic schedule based on the traffic shaping parameters; and means for scheduling the cells according to the traffic schedule.

30. The communications apparatus of claim 26, wherein the means for selecting the first mode or the second mode comprises:

means for selecting the first mode when the available bandwidth is greater than or equal to the required bandwidth; and means for selecting the second mode when the available bandwidth is less than the required bandwidth.

31. A method for scheduling cells associated with a plurality of communications channels on a digital subscriber line comprising:

determining an available bandwidth of the line;

determining a required bandwidth for the communications channels, wherein the required bandwidth comprises a combined sustained cell rate for the communications channels;

comparing the required bandwidth and the available bandwidth;

selecting a first mode of operation or a second mode of operation based on the comparison, wherein selecting the first mode or the second mode comprises:

selecting the first mode when the available bandwidth is greater than or equal to the required bandwidth; and selecting the second mode when the available bandwidth is less than the required bandwidth;

in the first mode of operation, scheduling the communication of the cells using an asynchronous transfer mode (ATM) communications protocol, wherein scheduling the communication of the cells using the ATM communications protocol comprises:

determining first traffic shaping parameters for the communications channels;

determining a traffic schedule based on the first traffic shaping parameters; and scheduling the cells according to the traffic schedule; and in the second mode of operation, scheduling the communication of the cells using a high priority queue in combination with the ATM communications protocol, wherein scheduling the communication of the cells using the high priority queue in combination with the ATM communications protocol comprises:

assigning a communications channel for voice communications to the high priority queue;

determining second traffic shaping parameters for remaining communications channels not assigned to the high priority queue;

determining a traffic schedule based on the second traffic shaping parameters;

scheduling cells from communications channels assigned to the high priority queue for communication before other cells from the remaining communications channels; and scheduling the communication of the other cells according to the traffic schedule.

* * * * *